United States Patent

[11] 3,542,213

[72] Inventors Erwin Gram,
Wilhelmsburg,
Peter Kostl, St. Polten, Hans Grubl, and
Josef Schretzmayer, Wilhelmsburg, Austria
[21] Appl. No. 725,439
[22] Filed April 30, 1968
[45] Patented Nov. 24, 1970
[73] Assignee Ospag, Osterreichische Sanitar-Keramik-und Porzellan-Industrie Aktiengesellschaft,
Vienna, Austria
[32] Priority July 7, 1967
[33] Austria
[31] 6366/67

[54] APPARATUS FOR TRANSPORTING CERAMIC MOLDS
7 Claims, 5 Drawing Figs.
[52] U.S. Cl. .................................................. 214/1;
212/129, 25/40
[51] Int. Cl. .................................................. B66c 1/42
[50] Field of Search ........................................ 214/1B2,
1B4, 1R, 1R3, 312, 313; 212/125, 128, 129; 25/40

[56] References Cited
UNITED STATES PATENTS

| | | | |
|---|---|---|---|
| 3,206,052 | 9/1965 | Kennedy | 214/313 |
| 738,017 | 9/1903 | Elton | 25/40 |
| 3,104,016 | 9/1963 | Harry | 215/125X |
| 3,225,891 | 12/1965 | Hickin | 214/1(BS2) |

*Primary Examiner*—Gerald M. Forlenza
*Assistant Examiner*—George F. Abraham
*Attorney*—Eugene E. Geoffrey, Jr.

ABSTRACT: Apparatus for automatically removing molds containing ceramic articles from a casting conveyer, depositing them on a forming-out table and then transporting empty molds to the casting conveyer.

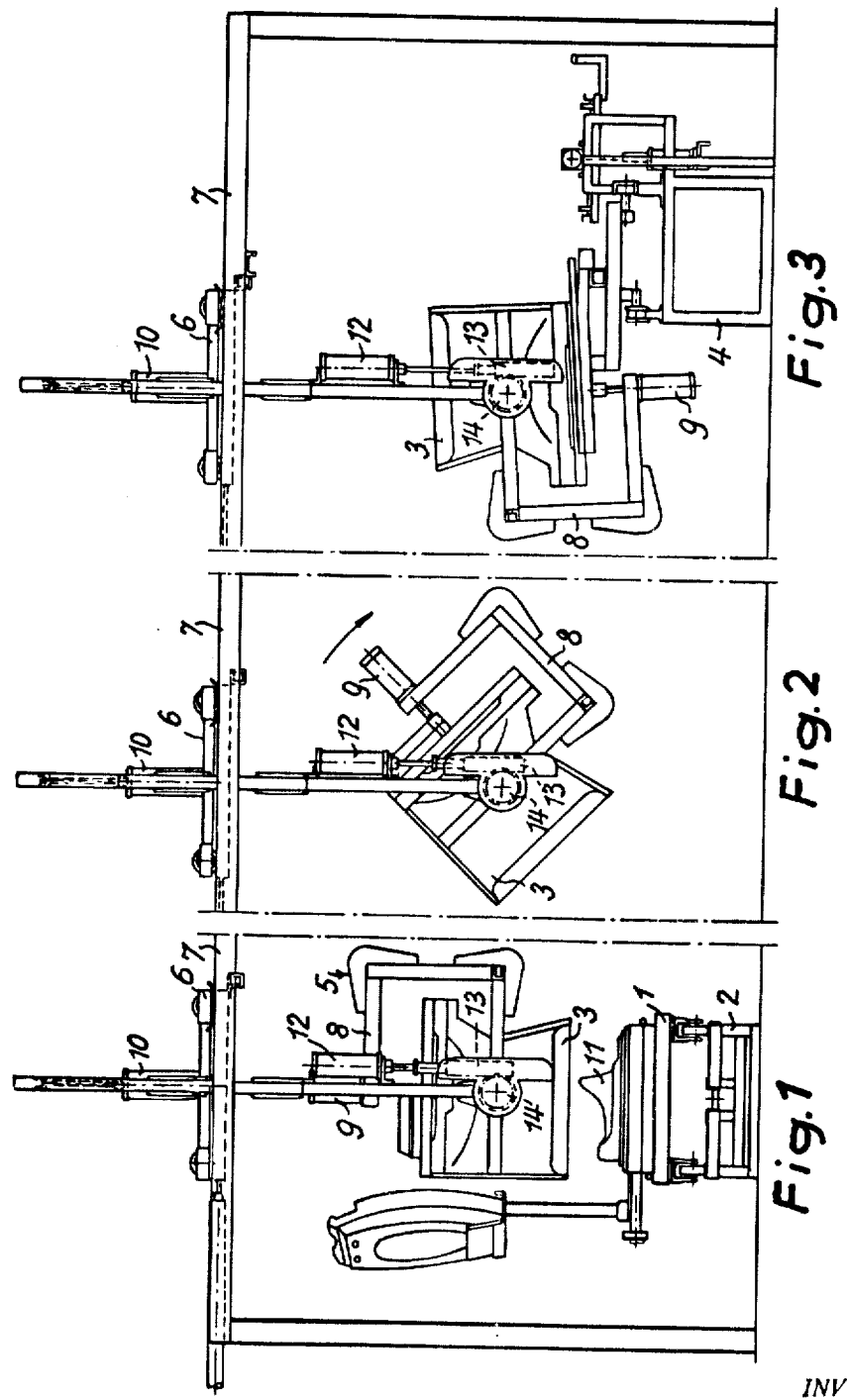

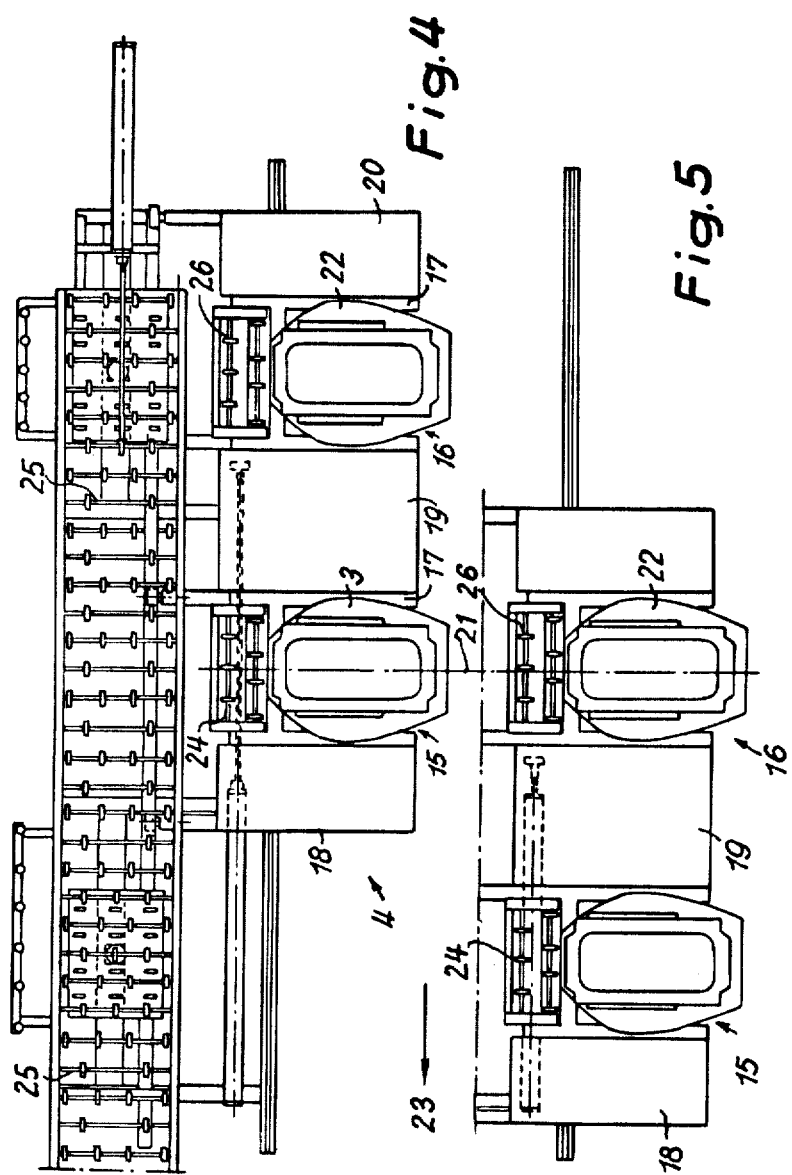

APPARATUS FOR TRANSPORTING CERAMIC MOLDS

This invention relates to apparatus for use in the manufacture of ceramic articles such as toilet bowls and the like, and, more specifically, to novel and improved apparatus for removing molds containing formed ceramic articles from a casting conveyor and depositing them on a forming-out table and then transporting an empty mold to the casting conveyor Known apparatus for transferring molds from a casting conveyor to a forming-out table utilized a lifting fork which engaged the mold, removed it completely from the casting conveyor and then rotated it through an angle of 180° about an axis generally parallel with the arms of the lifting fork. The fork was then rotated about a vertical axis to deposit the mold on a fixed forming-out table. This prior apparatus was relatively complicated, delayed the operating of the casting conveyor since the mold to be formed-out had to be removed from the forming-out station and an empty mold placed in position so that it could be transferred to the casting conveyor. This invention overcomes the disadvantages of prior devices and provides a novel and improved apparatus which simplifies the removal and transferral of a mold to be formed-out from a casting conveyor to the forming-out station and improved forming-out table having at least two stations so that it can be moved parallel to the casting conveyor and its replacement by an empty mold can be effected quickly and easily so that the entire manufacturing process can be greatly accelerated.

Another object of the invention resides in the provision of novel and improved apparatus involving means for gripping a ceramic mold on a casting conveyor, lifting it from the conveyor and substantially simultaneously therewith rotating it about an axis normal to the leading and trailing sides of the mold and depositing it on a forming-out table. Since the lifting and tilting motions can be effected substantially simultaneously with the transport of the mold to the forming-out table, the operation can be effected quickly and easily.

Another object of the invention resides in the provision of a novel and improved forming-out table for use in connection with casting conveyors wherein said table includes at least two forming-out positions which can be quickly alined with the forming-out station. With this arrangement, the transfer of a mold containing a ceramic article from the casting conveyor to the forming-out station and its replacement by an empty mold can be effected with a minimum loss of time.

Still another object of the invention resides in the provision of novel and improved apparatus for removing molds from a casting conveyor and replacing them with empty molds.

The above and other objects and advantages of the invention will become more apparent from the following description and accompanying drawings forming part of this application. In the Drawings:

FIG. 1 is a side elevational view of transporting apparatus in accordance with the invention and illustrating the mold in a raised position above the casting conveyor;

FIG. 2 is a side elevational view similar to FIG. 1 but with the mold in a partially rotated position;

FIG. 3 is a side elevational view of the transporting apparatus similar to FIGS 1 and 2 and illustrating the deposition of the inverted mold on the forming-out station;

FIG. 4 is a plan view of the forming-out table in accordance with the invention with one forming-out position in alinement with the mold transporting means; and FIG. 5 is a plan view of the forming-out table shown in FIG. 4 but with a second forming-out position in alinement with the transporting means.

Broadly, the invention involves an improved forming-out table and mold transporting means particularly useful in connection with automatic apparatus for fabricating large ceramic articles such as toilet bowls and the like. It will become apparent, however, that the invention is useful in the manufacture of all types of ceramic articles fabricated by filling a mold with liquid slip and then draining the excess slip from the mold after the desired thickness of materials has been deposited on the inner surface of the mold.

The casting conveyor on which the ceramic articles are formed includes a plurality of carriages, each supporting an individual mold and the casting conveyor is operated intermittently to bring successive molds in line with a forming-out station positioned adjoining the conveyor. With the apparatus in accordance with the invention a lifting fork carried by an overhead trolley engages and grips the leading and trailing sides of a mold on the casting conveyor, lifts it from its carriage, inverts it, and deposits it on the forming-out station. The forming-out station is in the form of a table having at least two forming-out positions so that an empty mold can be assembled on one forming-out position while the transporting apparatus is depositing a mold from the casting conveyor onto the other forming-out position alined with the forming-out station. Immediately upon deposition of the mold from the casting conveyor, the table is displaced to bring the empty mold in alinement with the forming-out station so that the transporting means can engage the empty mold and immediately transfer it to the casting conveyor. By reason of an improved structure and operation of the forming-out table and the transporting apparatus, the entire procedure can be carried out quickly and efficiently and thus reduce the conveyor delay time to a minimum.

More specifically and with reference to the drawings, the casting conveyor 2 is illustrated in FIG. 1 and includes a carriage 1 carrying the bottom section of a mold for a toilet bowl. The top of the mold has been removed and rests on a support extending from the carriage 1. The main body of the mold is denoted by the numeral 3 and in FIG. 1 is shown in a slightly elevated position and supported by the transporting apparatus in accordance with the invention. The transporting apparatus includes mold engaging means 5 having a pair of lower parallel arms engaging the leading and trailing sides of the mold portion 3. The arms carry an L-shaped structure 8 having vertical and horizontal leg portions as shown in FIG. 1. The horizontal leg portion of the gripping means 5 carries a cylinder 9 which operates clamping means bearing against the top of the mold 3. In this way, the mold portion 3 is securely held by the gripping or clamping means 5. The clamping means 5 is carried by a pair of vertical members each pivotally secured to one of the lower horizontal arms shown in FIG. 1 and extend upwardly through tracks 7 which carry a trolley 6. Fluid operated cylinders couple the vertical members to the trolley 6 and operate to raise and lower the mold body portion 3.

Each of the vertical lifting members carries a fluid operated cylinder 12 which in turn operates a rack 13. Gears 14 fixedly mounted relative to the mold engaging arms mesh with the racks 13. With this arrangement, after the mold portion 3 has been raised as shown in FIG. 1, it is then rotated about an axis normal to the mold engaging arms and a partially rotated position of the mold portion 3 is illustrated in FIG. 2. Rotation of the mold is continued as the trolley 6 moves toward the forming-out table 4 as illustrated in FIG. 3. Upon arrival at the forming-out station, the mold portion 3 has been inverted and lowered onto the forming-out station. The gripping means 5 is then released and the trolley 6 is operated to move the mold engaging arms out of engagement with the mold portion 3.

The forming-out table is illustrated in FIGS. 4 and 5. In FIG. 4, the actual forming-out position, denoted by the numeral 15, is at the forming-out station which is denoted by the broken line 21 and represents the path of travel of the transporting means illustrated in FIGS. 1 to 3. For convenience, the broken line 21 has been coordinated with FIG. 5 to illustrate displacement of the forming-out table 4 to bring the forming-out position 16 in alinement with the mold transporting means.

Each forming-out position 15 and 16 on the forming-out table 4 includes a U-shaped structure 17 formed between the surfaces 18, 19 and 20. With this arrangement the mold portion 3 can be deposited on the forming-out position 15 when at the forming-out station so that the clamping means 5 may be readily disengaged. Upon removal of the clamping means from the mold portion 3, the table 4 is moved in the direction of the arrow 23 to the position shown in FIG. 5. An empty mold 22 has been positioned on the forming-out position 16 and upon displacement of the table to the position shown in FIG. 5, the clamping means 5 can be immediately moved into engagement with the mold 22 and place it on the casting conveyor. During this operation the forming-out operation of the mold portion 3 takes place at forming-out position 15 as shown in FIG. 5 in which the mold halves are moved onto the side rests 18 and 19 and the formed bowl or green ware is moved over the conveyor 24 and onto the conveyor 25 for further processing. By the time the casting conveyor has been displaced and the transporting mechanism has deposited the next mold on the forming-out position 16, the empty mold will have been reassembled on the position 15 whereupon the table 4 can then be moved to the position as shown in FIG. 4 so that the empty mold can be transferred immediately to the casting conveyor.

The operation of the clamping cylinder 9, the lifting cylinder 10, the rotary motion cylinder 12 and the transportation of the trolley 6 can be automatically controlled and coordinated with the intermittent movement of the casting conveyor and displacement of the forming-out table 4 so that the entire operation can be performed by a single operator.

While only one embodiment of the invention has been illustrated and described, it is apparent that alterations, modifications and changes may be made therein without departing from the true scope and spirit thereof.

We claim:

1. Apparatus for transporting ceramic molds containing a formed ceramic article from a casting conveyor to a forming-out table and replacing an empty mold on said conveyor, said molds having projections extending from the sides thereof, said transporting means comprising means for engaging said projections on the leading and trailing sides of said mold and the top of said mold, elevating means secured to said engaging means for lifting the mold, means carried by said lifting means for rotating said mold about an axis normal to said sides to invert said mold and horizontal transporting means supporting said lifting means to transport said mold in a path between the casting conveyor and said forming-out table said engaging means including a pair of fixedly spaced arms, adapted to underlie said projections and a clamp carried by said arms and movable into engagement with the top of the mold to firmly hold the engaging means in engagement with the mold while at the same time avoiding the application of pressure normal to the sides of said mold.

2. Apparatus according to claim 1 wherein said clamp includes a fluid actuated cylinder.

3. Apparatus according to claim 1 wherein said lifting means comprises a pair of vertical members carried at their upper ends by said transporting means and pivotally secured at their lower ends to said spaced arms.

4. Apparatus for transporting ceramic molds containing a formed ceramic article from a casting conveyor to a forming-out table and replacing an empty mold on said conveyor comprising means for gripping the leading and trailing sides of said mold, elevating means secured to said gripping means for lifting the mold, means carried by said lifting means for rotating said mold about an axis normal to said sides to invert said mold and horizontal transporting means supporting said lifting means to transport said mold in a path between the casting conveyor and said forming-out table said gripping means including a pair of spaced arms, said mold sides including arm engaging means and said gripping means further including a clamp carried by said arms and engaging the top of the mold to firmly hold the gripping means in engagement with the mold, said lifting means comprising a pair of vertical members carried at their upper ends by said transporting means and pivotally secured at their lower ends to said spaced arms, at least one of said spaced arms including a gear fixedly secured thereto coaxially of said pivot and said vertical member associated with said arm includes a rack engaging said gear and fluid actuating means for moving said rack to rotate said mold.

5. Apparatus for transporting ceramic molds containing a formed ceramic article from a casting conveyor to a forming-out table and replacing an empty mold on said conveyor comprising means for gripping the leading and trailing sides of said mold, elevating means secured to said gripping means for lifting the mold, means carried by said lifting means for rotating said mold about an axis normal to said sides to invert said mold and horizontal transporting means supporting said lifting means to transport said mold in a path between the casting conveyor and said forming-out table said gripping means including a pair of spaced arms, said mold sides including arm engaging means and said gripping means further including a clamp carried by said arms and engaging the top of the mold to firmly hold the gripping means in engagement with the mold, said transporting means comprising an overhead trolley supported by tracks alined with a position on the casting conveyor and said forming-out station, said lifting means include a pair of vertical members carried by said trolley, means for vertically displacing said members relative to said trolley and means pivotally securing the lower ends of said members to said gripping means.